Sept. 22, 1925. Re. 16,170

R. G. WILLIAMS

POLE MOUNTING

Original Filed Oct. 16, 1922 2 Sheets-Sheet 1

Inventor
Rolland G. Williams
by
Attorney

Sept. 22, 1925. Re. 16,170

R. G. WILLIAMS

POLE MOUNTING

Original Filed Oct. 16, 1922 2 Sheets-Sheet 2

Inventor
Rolland G. Williams
by
J. W. [illegible]
Attorney

Reissued Sept. 22, 1925.

Re. 16,170

UNITED STATES PATENT OFFICE.

ROLLAND G. WILLIAMS, OF BRIDGEPORT, CONNECTICUT, ASSIGNOR TO THE CLARK-WILLIAMS ENGINEERING COMPANY, OF BRIDGEPORT, CONNECTICUT, A CORPORATION OF CONNECTICUT.

POLE MOUNTING.

Original No. 1,497,822, dated June 17, 1924, Serial No. 594,698, filed October 16, 1922. Application for reissue filed July 29, 1925. Serial No. 46,923.

*To all whom it may concern:*

Be it known that I, ROLLAND G. WILLIAMS, a citizen of the United States, residing at the city of Bridgeport, county of Fairfield, and State of Connecticut, have invented certain new and useful Improvements in Pole Mountings; and I do declare the following to be a full, clear, and exact description of the invention, such as will enable others skilled in the art to which it appertains to make and use the same.

This invention relates to certain new and useful improvements in pole mountings and pertains more particularly to and is an improvement upon the pole mountings disclosed in my Patents Nos. 1,392,730, of October 4, 1921, and 1,430,136, of September 26, 1922.

In the prior pole mountings, it has been found that the webs indicated at 7 in my said Patent No. 1,392,730, do not adequately function, since the great strains imposed upon the pole by high winds or unequally distributed weights of wires and cross arms at the upper end of the pole, cause the webs 7 to bind at the central portions of the feet or bases 8 against the cement foundation, incessant strains of this character resulting in the bases 8 lifting from the cement foundation and particularly at the sides or corners of the bases 8. This lifting of the bases 8, occurred notwithstanding the presence of the anchoring bolts 10.

The present invention therefore aims to provide a structure of pole mounting which eliminates the objections noted and which properly and uniformly distributes the strain and thereby overcomes lifting of the bases from the cement foundation.

Still further the invention aims to provide a structure in which the same is more effectively reinforced and which has means for draining off of water which may collect on the concrete base beneath the lower end of the pole.

The invention also aims to generally improve the construction and to provide a stronger and more efficient mounting.

The invention has still further and other objects which will be later set forth and manifested in the course of the following description.

In the drawings:—

Figure 1:
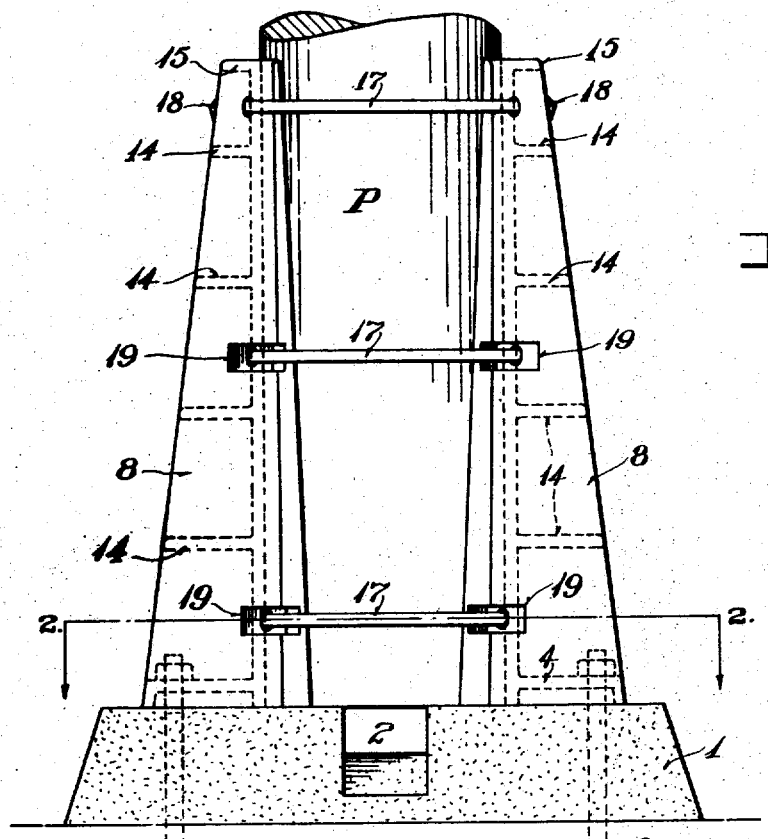
Figure 1 is a front elevation of the invention.
Figure 2:
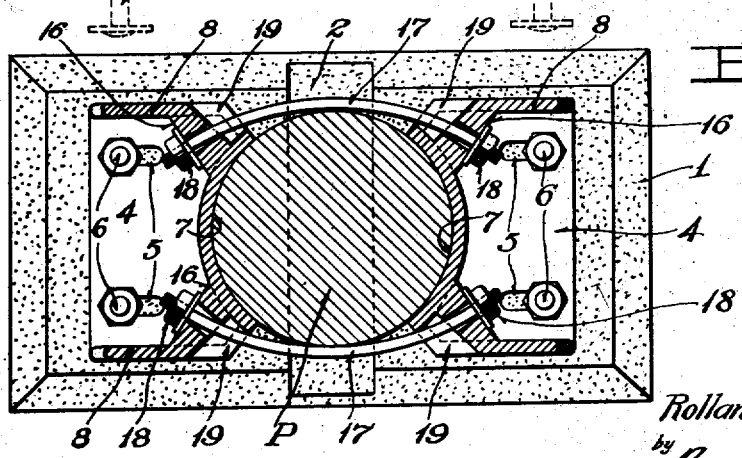
Figure 2 is a section on line 2—2 of Figure 1.
Figure 3:
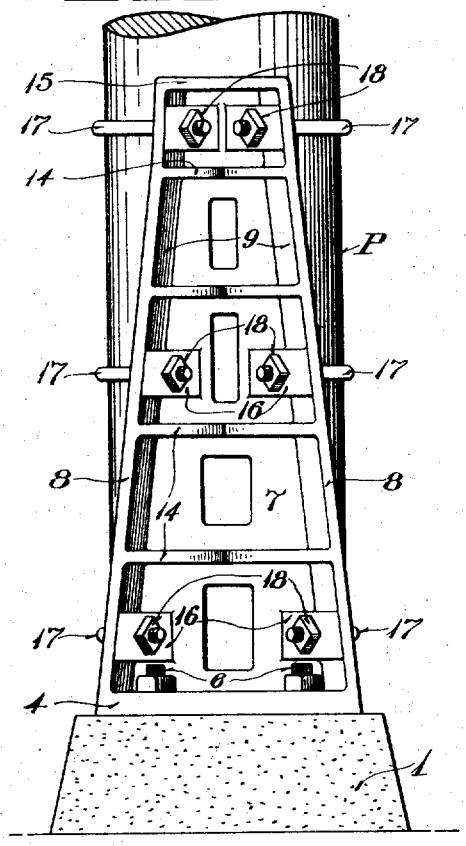
Figure 3 is a side elevation.
Figure 4:
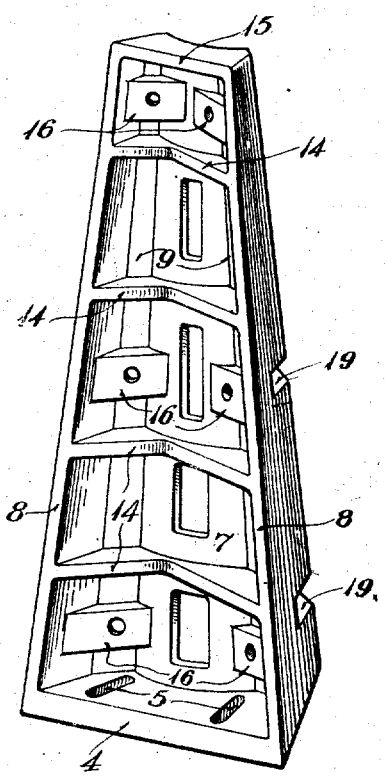
Figure 4 is a detail perspective view of one of the vertical supports or uprights.
Figure 5:
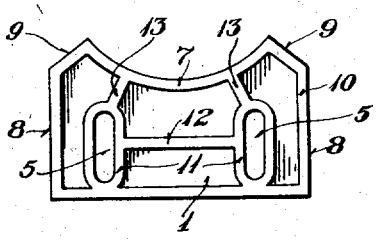
Figure 5 is a bottom plan view of Figure 4.

In proceeding in accordance with the present invention, a concrete base or foundation 1 is employed, which latter is preferably provided with a transverse central drain or channel 2, the bottom of which is on an incline so as to cause water, or moisture condensations, to flow out from beneath the pole bottom to thereby maintain the latter dry and against rotting. This channel, moreover, allows air to constantly contact with the pole bottom to dry the latter and maintain same dry.

A pair of vertical uprights or supports 3 is employed, each of similar construction and embodying a base 4 formed with slots 5 to receive the anchoring bolts 6 that are embedded or molded in the concrete base or foundation 1.

The uprights or supports are preferably one-piece or integral castings and have curved inner vertical faces 7 and sides or wings 8. The wings 8 act as reenforcing braces and extend from the curved faces 7, inclining outwardly from the top of said faces down to the bases 4, and said wings, faces and bases are integral.

In order to further strengthen the structure, the wings may be connected to the curved faces 7 by beveled parts 9, and, in order that the supports may obtain a better grasp on poles that have uneven or irregular surfaces the side edges of the curved faces preferably converge from the bottom so that they gradually decrease in width from the bottom to the top.

The under or bottom face of the base 4 is formed with reenforcing rib 10 which follows the marginal outline of the base and with similar elliptical ribs 11 and connecting ribs 12 and 13, the ribs 11 encompassing the slots 5. The several ribs afford edges which engage and provide a firm footing on the concrete base or foundations.

In order to still further strengthen the uprights, lateral braces or webs 14 are preferably employed integral with the uprights and connecting the wings 8 and the beveled parts 9, while the upper parts and ends of the wings 8 and the beveled parts 9 are preferably connected by webs 15, the uppermost of the latter affording tops for the uprights.

At the inner faces of the wings 8 at or about the points of their junction with the beveled parts 9, are located perforated bosses 16 which receive the ends of curved pole gripping straps 17, the ends of the latter being threaded to receive nuts 18, while the beveled parts 9 have openings 19 to permit the passage of said straps through the bosses.

From the foregoing it will be apparent that the pole is firmly held between the two uprights. In practice it has been demonstrated that by the use of the present invention, the uprights remain firmly in position and do not work loose at the sides or corners as in the prior devices above mentioned.

The beveled parts 9, while they strengthen and stiffen the structure and distribute the stresses of the pole throughout the length of the uprights, are precautionary provisions, and may be omitted if desired, but I prefer to employ them since they are formed with the casting at a trifling additional cost and really make the uprights stronger.

The horizontal webs 14, 15, intermediate the wings 8 tie the latter together and also strengthen the uprights, but in localities where the stresses on the pole are not apt to be severe these webs may be omitted.

The ribs 10, 11, 12, and 13, at the bottom faces of the bases 4, are good features, but may be omitted if desired.

In all instances, however, the integral tapering wings at the edges of the uprights are necessary with their lower or broadest portions integral with the bases of the uprights, this being the gist of my invention.

What is claimed is:—

1. In a pole mounting, a pole, a concrete foundation, a pair of uprights having bases formed with depending rbis engaged with the upper face of the concrete, anchoring bolts embedded in the concrete and secured to the upright bases, said uprights having curved inner pole-engaging faces, wings extending outwardly from the sides of the uprights, beveled parts connecting the wings to the curved faces, transverse spaced webs connected to the wings, beveled parts and the rears of the faces, perforated bosses in the corners formed by the wings, beveled parts and the rears of the faces, and curved pole engaging rods having nuts thereon, the rod ends being extended through the perforations in the bosses.

2. In a pole mounting, a pole, a concrete foundation, a pair of uprights having bases engaged with the upper face of the concrete, anchoring bolts embedded in the concrete and secured to the upright bases, said uprights having curved inner pole-engaging faces, wings extending outwardly from the sides of the uprights, reenforcing means connecting the wings and the main body portions of the uprights, and means to secure the uprights to the pole.

3. In combination with a pole, a concrete foundation upon which the pole is mounted, uprights having bases seated on the concrete, said uprights having curved pole engaging faces of gradually decreasing widths from the bottom to the top of the uprights and further having tapering wings extending outwardly from the sides of the uprights and adjoining the bases, transverse spaced webs connecting the wings, and means to secure the uprights to the pole.

4. In a pole mount, a concrete foundation upon which the pole is mounted, bolts anchored in said foundation and extending upwardly beyond the face thereof, uprights having bases seated on said foundation and having slots through which said polts project, nuts driven on said bolts whereby said bases are secured in position on said foundation, said uprights having curved pole engaging faces and further having tapering wings extending outwardly from the side edges of the uprights and adjoining the bases, curved pole gripping straps on opposite sides of the pole and having their extremities extending through the opposed uprights, and nuts driven on the ends of said straps whereby the latter may be closely contacted with the pole and the uprights caused to firmly grip said pole.

In testimony whereof, I affix my signature hereto.

ROLLAND G. WILLIAMS.